United States Patent
Ohishi

(10) Patent No.: US 8,854,651 B2
(45) Date of Patent: Oct. 7, 2014

(54) IMAGE FORMING APPARATUS, INFORMATION PROCESSING METHOD, AND RECORDING MEDIUM INDICATING A VERSION OF A FUNCTION SUPPORTED BY THE IMAGE FORMING APPARATUS

(75) Inventor: Tsutomu Ohishi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1160 days.

(21) Appl. No.: 11/377,245

(22) Filed: Mar. 17, 2006

(65) Prior Publication Data

US 2006/0222176 A1   Oct. 5, 2006

(30) Foreign Application Priority Data

Mar. 31, 2005 (JP) .................. 2005-102852
Mar. 1, 2006 (JP) .................. 2006-055026

(51) Int. Cl.
  *G06F 3/12* (2006.01)
  *H04N 1/00* (2006.01)
  *G06F 9/445* (2006.01)
  *H04N 1/32* (2006.01)

(52) U.S. Cl.
  CPC .... *H04N 1/32561* (2013.01); *H04N 2201/0094* (2013.01); *H04N 1/00912* (2013.01); *H04N 1/32496* (2013.01); *G06F 9/445* (2013.01)
  USPC ............ 358/1.15; 358/1.1; 709/230; 715/748

(58) Field of Classification Search
  USPC .................................. 358/1.1–1.16
  See application file for complete search history.

(56) References Cited

U.S. PATENT DOCUMENTS

| 6,272,674 B1* | 8/2001 | Holiday, Jr. .................. 717/174 |
| 6,915,337 B1* | 7/2005 | Motoyama et al. ........... 709/220 |
| 2002/0095425 A1* | 7/2002 | Abu-Husein .................. 707/100 |
| 2003/0076521 A1* | 4/2003 | Li et al. ........................ 358/1.13 |
| 2003/0133136 A1 | 7/2003 | Ohishi et al. |
| 2003/0140174 A1 | 7/2003 | Ohishi et al. |
| 2003/0159135 A1* | 8/2003 | Hiller et al. ................... 717/166 |
| 2003/0218765 A1 | 11/2003 | Ohishi et al. |

(Continued)

FOREIGN PATENT DOCUMENTS

| JP | 4-358169 | 12/1992 |
| JP | 10-171634 A | 6/1998 |

(Continued)

OTHER PUBLICATIONS

Office Action issued Jun. 21, 2011, in Japanese Patent Application No. 2011-015554.

(Continued)

*Primary Examiner* — Benny Q Tieu
*Assistant Examiner* — Michael Y Tzeng
(74) *Attorney, Agent, or Firm* — Oblon, Spivak, McClelland, Maier & Neustadt, L.L.P.

(57) ABSTRACT

An image forming apparatus including an application is disclosed. The image forming apparatus includes a determining unit that, when the application starts in the image forming apparatus, checks first information indicating a function to be used by the application against second information indicating a function supported by the image forming apparatus so as to determine whether the function to be used by the application is executable, and changes operations of the application according to a determination result. The determining unit is automatically updated if the determining unit does not support a structure of the first information or a structure of the second information.

13 Claims, 17 Drawing Sheets

(56) References Cited

U.S. PATENT DOCUMENTS

| | | | |
|---|---|---|---|
| 2004/0057067 A1 | 3/2004 | Ohishi et al. | |
| 2004/0057074 A1 | 3/2004 | Ohishi et al. | |
| 2004/0109188 A1* | 6/2004 | Akiyoshi et al. | 358/1.13 |
| 2004/0125414 A1 | 7/2004 | Ohishi et al. | |
| 2004/0128532 A1 | 7/2004 | Ohishi et al. | |
| 2004/0130747 A1 | 7/2004 | Ohishi et al. | |
| 2004/0218208 A1 | 11/2004 | Akiyoshi et al. | |
| 2004/0255263 A1 | 12/2004 | Ando | |
| 2005/0057771 A1 | 3/2005 | Ohishi et al. | |
| 2006/0069824 A1* | 3/2006 | Hodder | 710/72 |
| 2006/0070055 A1* | 3/2006 | Hodder et al. | 717/168 |
| 2006/0168157 A1* | 7/2006 | Kouda | 709/220 |

FOREIGN PATENT DOCUMENTS

| | | |
|---|---|---|
| JP | 10-232774 | 9/1998 |
| JP | 2001-51857 A | 2/2001 |
| JP | 2001-195238 A | 7/2001 |
| JP | 2002-84383 | 3/2002 |
| JP | 2004-129220 | 4/2004 |
| JP | 2004-185489 A | 7/2004 |
| JP | 2004-303135 | 10/2004 |
| JP | 2004-312711 | 11/2004 |
| JP | 2004-355596 | 12/2004 |
| JP | 2005-38011 | 2/2005 |

OTHER PUBLICATIONS

Japanese Office Action issued Aug. 30, 2011, in Patent Application No. 2011-015554.

Japanese Office Action Issued Jan. 8, 2013 in Patent Application No. 2011-173599.

Office Action issued Jan. 21, 2014 in Japanese Patent Application No. 2013-101128.

* cited by examiner

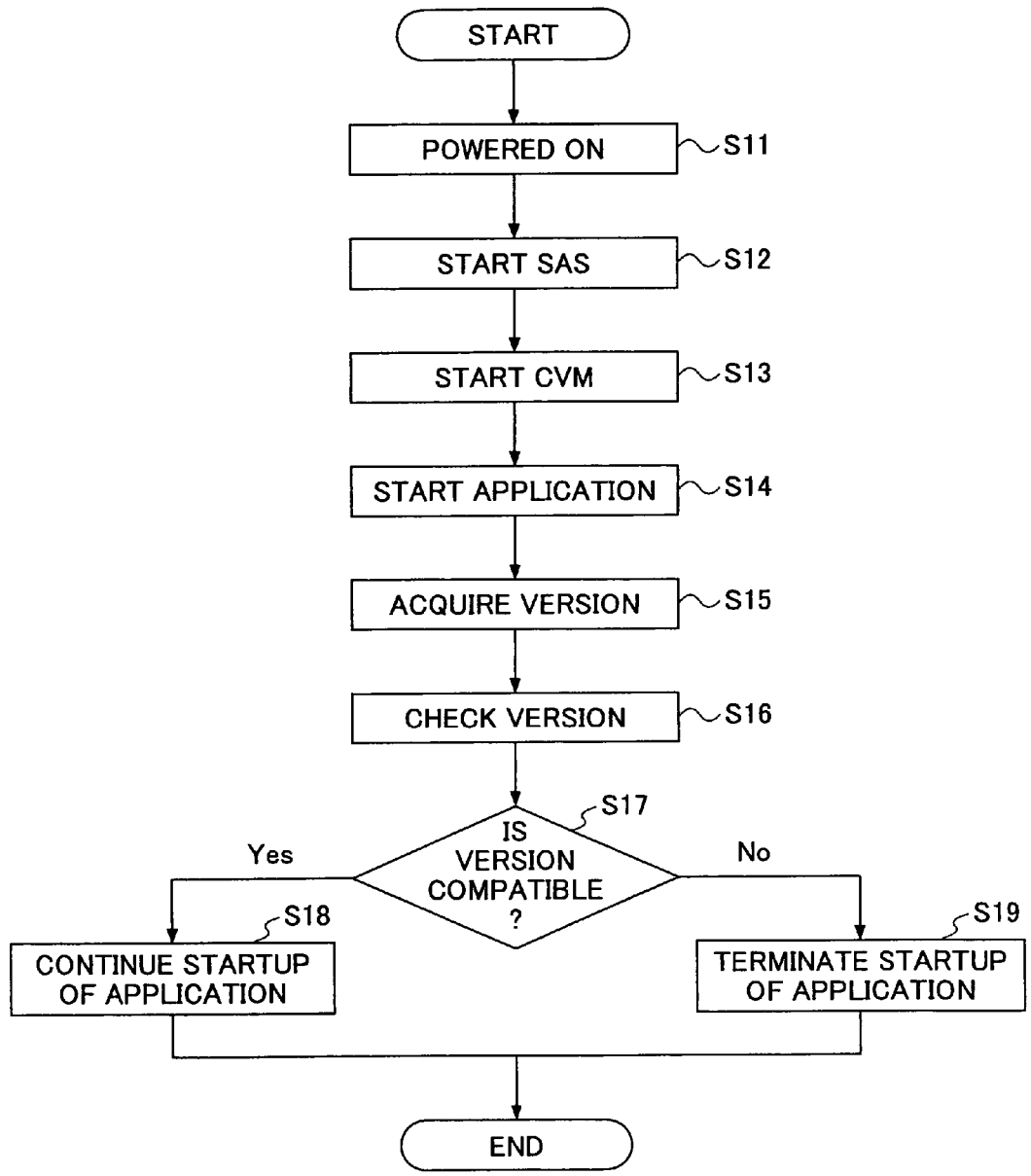

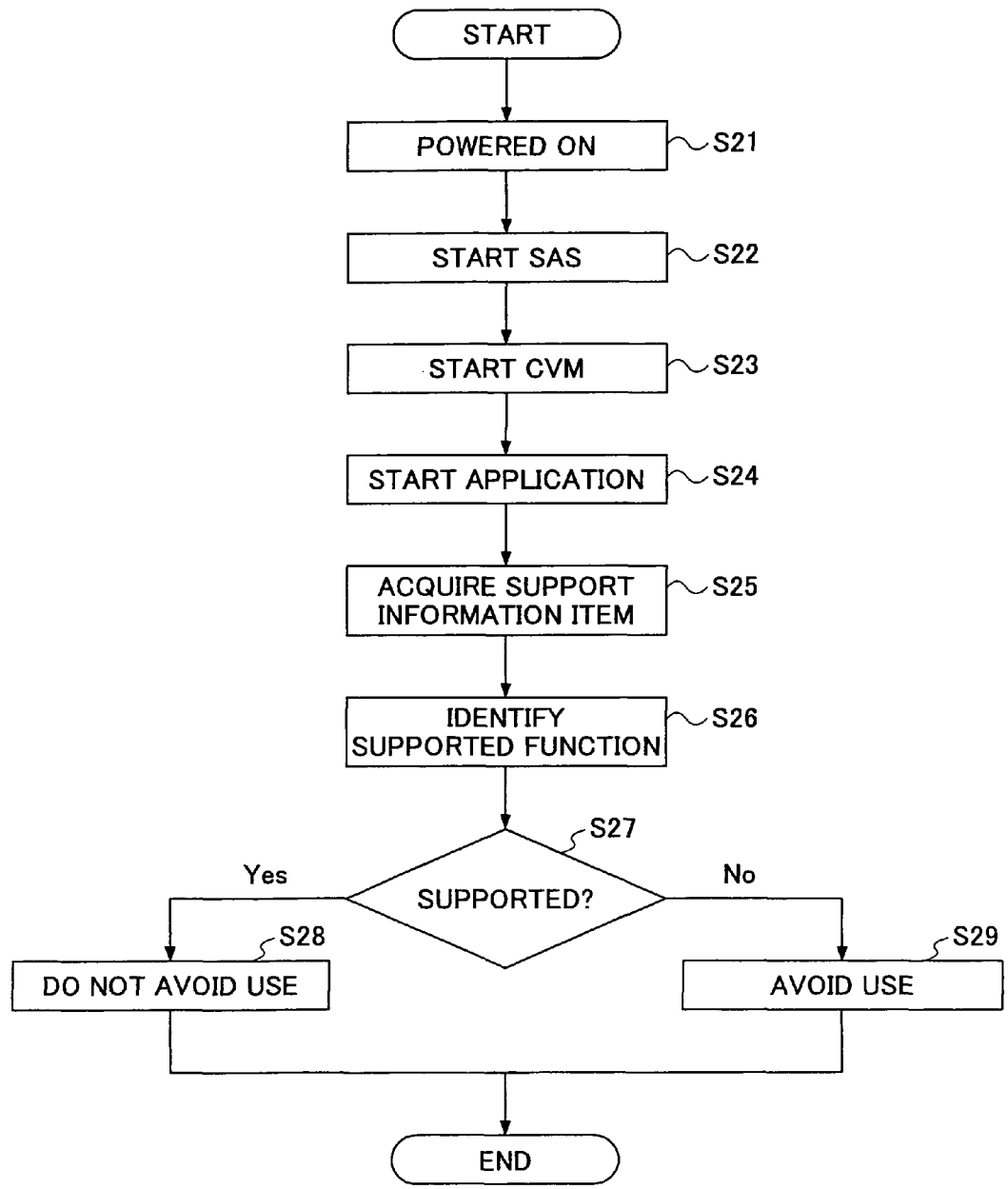

FIG.15

```
<? xmlversion = "1.0" encoding = "Shift_JIS" ?>
<inf_version>1.2</inf_version>
<function_list>
   <copy>1.03</copy>
   <scan>1.10</scan>
   <print>1.00</print>
   <CVM>1.0.1</CVM>
         :

<function_list>
```

```
<? xmlversion = "1.0" encoding = "Shift_JIS" ?>
<inf_version>1.3</inf_version>
<function_list>
   <CVM>1.0.2</CVM>
         :

<function_list>
```

```
<? xmlversion = "1.0" encoding = "Shift_JIS" ?>
<action_list>
  <copy></copy>
    <action>update</action>      ─ 8011
  </copy>
  <scan>
    <action>ignore</action>      ─ 8012
  </scan>
       :
  <CVM>
    <action>update</action>      ─ 8013
  </CVM>
       :
</action_list>
```

800

801

IMAGE FORMING APPARATUS, INFORMATION PROCESSING METHOD, AND RECORDING MEDIUM INDICATING A VERSION OF A FUNCTION SUPPORTED BY THE IMAGE FORMING APPARATUS

BACKGROUND OF THE INVENTION

1. Field of the Invention

The present invention relates to an image forming apparatus such as a copier, a printer, a scanner, a facsimile, a multifunction machine, and a compound machine; an information processing method; and a recording medium such as an SD card.

2. Description of the Related Art

In recent year, multifunction machines and compound machines having copy, printer, scanner, and facsimile functions have been available in the market. The multifunction machines and the compound machines can print images on printing paper when used as copiers or printers, scan images from original documents when used as copiers or scanners, and send and receive images to and from other communication apparatuses via telephone lines when used as facsimiles.

Patent Document 1 discloses an invention related to an image forming apparatus having copy, printer, scanner, and facsimile functions. The image forming apparatus is provided with software corresponding to applications as well as software corresponding to platforms. The image forming apparatus is also provided with application program interfaces and engine interfaces.

<Patent Document 1> Japanese Patent Laid-Open Publication No. 2002-084383

Image forming devices and applications for the image forming apparatuses are available in various models and versions. Due to such variety of models and versions, a certain version of an application that works properly in a certain model and a certain version of an image forming apparatus might not work properly in a different model and a different version of an image forming apparatus. Such a situation should be avoided because frequent occurrence of such a situation erodes trust in products.

SUMMARY OF THE INVENTION

The present invention may solve the problem described above. A preferred embodiment of the present invention may prevent problems due to incompatibility between an image forming apparatus available in various models and versions and an application available in various models and versions for the image forming apparatus.

According to an aspect of the present invention, there is provided an image forming apparatus that comprises an application; and a determining unit that, when the application starts in the image forming apparatus, checks first information indicating a function to be used by the application against second information indicating a function supported by the image forming apparatus so as to determine whether the function to be used by the application is executable, and changes operations of the application according to a determination result; wherein the determining unit is automatically updated if the determining unit does not support a structure of the first information or a structure of the second information.

According to another aspect of the present invention, there is provided an image forming apparatus that comprises a startup controlling unit to start an application and a sequential execution program loaded in the image forming apparatus from a recording medium storing the application and the sequential execution program, the sequential execution program being adapted to sequentially execute applications translated by a compiler, wherein upon starting the application in the image forming apparatus from the recording medium storing the application, the startup controlling unit automatically selects the sequential execution program whose version supports the image forming apparatus from plural of sequential execution programs stored in the recording medium, and starts the selected sequential execution program in the image forming apparatus.

According to a further aspect of the present invention, there is provided an image forming apparatus that comprises an application that, upon startup of the application in the image forming apparatus, checks a version of the application against a version of the image forming apparatus, and continues the startup of the application if the version of the application is compatible with the version of the image forming apparatus, but terminates the startup of the application if the version of the application is not compatible with the version of the image forming apparatus.

With the above described image forming apparatuses, problems due to incompatibility between the image forming apparatuses and applications for the image forming apparatuses can be prevented.

The present invention may be embodied as an information processing method to be performed by any of the above-described image forming apparatuses, and a recording medium storing a program that causes any of the above-described image forming apparatuses to perform the information processing method.

BRIEF DESCRIPTION OF THE DRAWINGS

FIG. 8 is a flowchart illustrating the startup control of the JSDK application according to the first embodiment;

FIG. 10 is a flowchart illustrating the startup control of the JSDK application according to the second embodiment;

FIG. 15 shows an example of a machine support information item;

FIG. 16 shows an example of an application use information item;

FIG. 17 shows an example of an action information item; and

DETAILED DESCRIPTION OF THE PREFERRED EMBODIMENT

Figure 1:
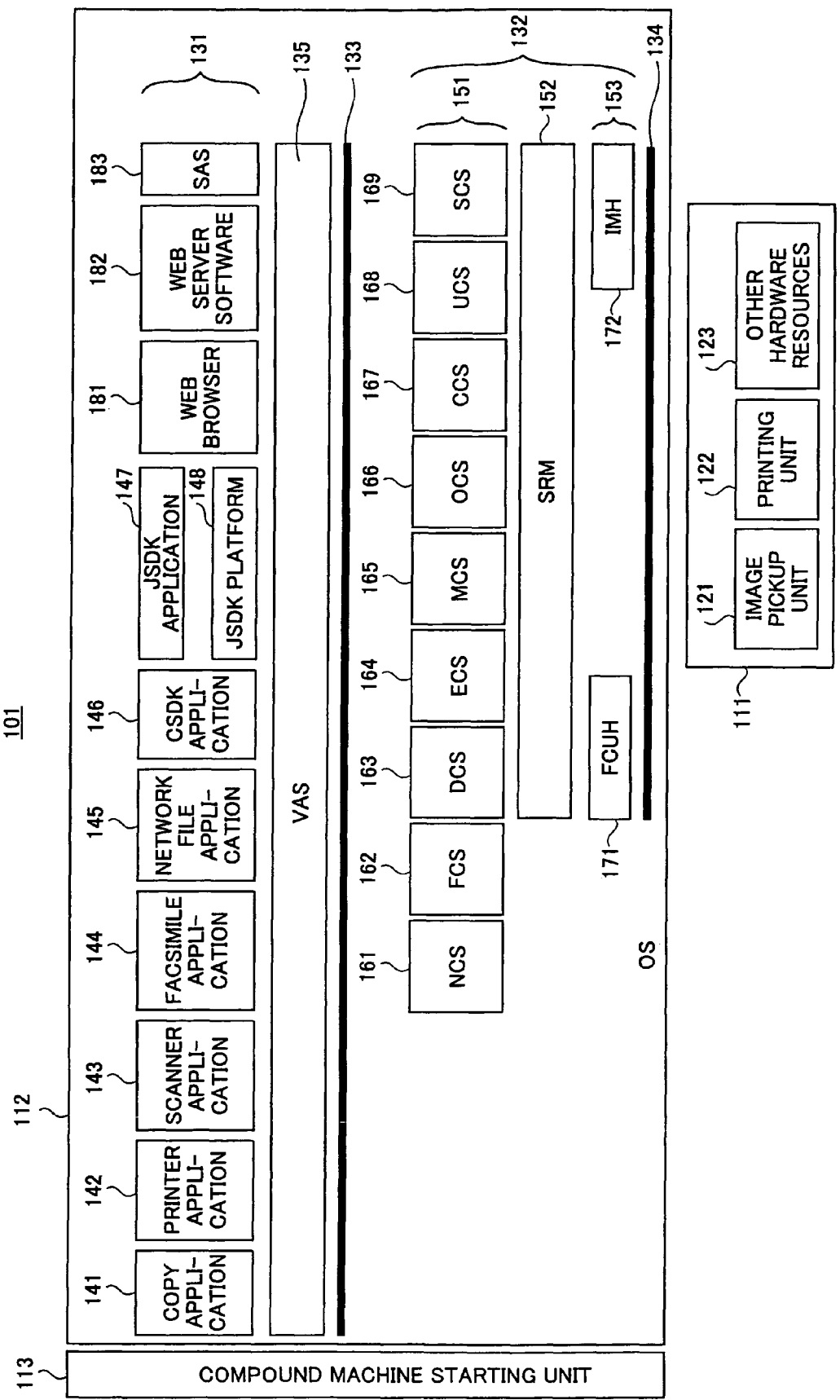
FIG. 1 is a block diagram illustrating a compound machine according to an embodiment of the present invention.

FIG. 1 is a block diagram illustrating a compound machine 101 according to an embodiment of the present invention. The compound machine 101 of FIG. 1 includes various hardware resources 111, various software resources 112, and a compound machine starting unit 113.

The hardware resources 111 of the compound machine 101 include an image pickup unit 121, a printing unit 122, and other hardware resources 123. The image pickup unit 121 is for reading images (image data) from original documents. The printing unit 122 is for printing images (image data) on printing paper.

The software resources 112 of the compound machine 101 include various applications 131 and various platforms 132. These programs are executed in parallel as processes by an OS (operating system) such as UNIX™.

The applications 131 include a copy application 141 for copying, a printer application 142 for printing, a scanner application 143 for scanning, a facsimile application 144 for faxing, and a network file application 145 for network files. The applications 131 further include a Web browser 181 for browsing Web pages, Web server software 182 for delivering Web pages, and a SDK application service (SAS) 183 for controlling a CSDK application 146 and a JSDK application 147.

The applications 131 can be developed by using dedicated SDKs (software development kits). The applications 131 developed by using the SDKs are called SDK applications. Examples of dedicated SDKs include "CSDKs" for developing the applications 131 in C, and "JSDKs" for developing the applications 131 in Java™. The application 131 developed by using the CSDK is called as a "CSDK application", and the application 131 developed by using the JSDK is called as a "JSDK application". The software compound machine 101 of FIG. 1 is provided with the CSDK application 146 and the JSDK application 147. The compound machine 101 of FIG. 1 is further provided with a JSDK platform 148 as the software resource 112 that serves as an interface between the JSDK application 147 written in Java™ and other software resources 112 written in C.

The platforms 132 include various control services 151, a system resource manager 152, and various handlers 153. The control services 151 include a network control service (NCS) 161, a facsimile control service (FCS) 162, a delivery control service (DCS) 163, an engine control service (ECS) 164, a memory control service (MCS) 165, an operations panel control service (OCS) 166, a certification control service (CCS) 167, a user directory control service (UCS) 168, and a system control service (SCS) 169. The handlers 153 include a facsimile control unit handler (FCUH) 171 and an image memory handler (IMH) 172.

A process of the NCS 161 controls network communications. A process of the FCS 162 provides a facsimile API. A process of the DCS 163 controls delivery of stored files. A process of the ECS 164 controls the image pickup unit 121 and the printing unit 122. A process of the MCS 165 controls memories and a hard disk drive 233 (described later). A process of the OCS 166 controls an operations panel 202. A process of the CCS 167 controls certification and charging processing. A process of the UCS 168 controls user information management. A process of the SCS 169 controls system management.

A virtual application service (VAS) 135 is provided as the software resource 112 that serves as an interface between the applications 131 and the platforms 132. The VAS 135 operates as a server process having the applications 131 as clients, and also operates as a client process having the platforms 132 as servers. The VAS 135 has a wrapping function for hiding the platforms 132 from the applications 131 and compensates for the version difference due to upgrade of the platforms 132.

When the compound machine 101 is powered on, the compound machine starting unit 113 is executed first. Thus the OS such as UNIX™ is started, so that the applications 131 and the platforms 132 are started. As these programs are stored in the hard disk drive 233 and a memory card 235 (both described later), the programs are read from the hard disk drive 233 and the memory card 235 and loaded into memories.

Figure 2:
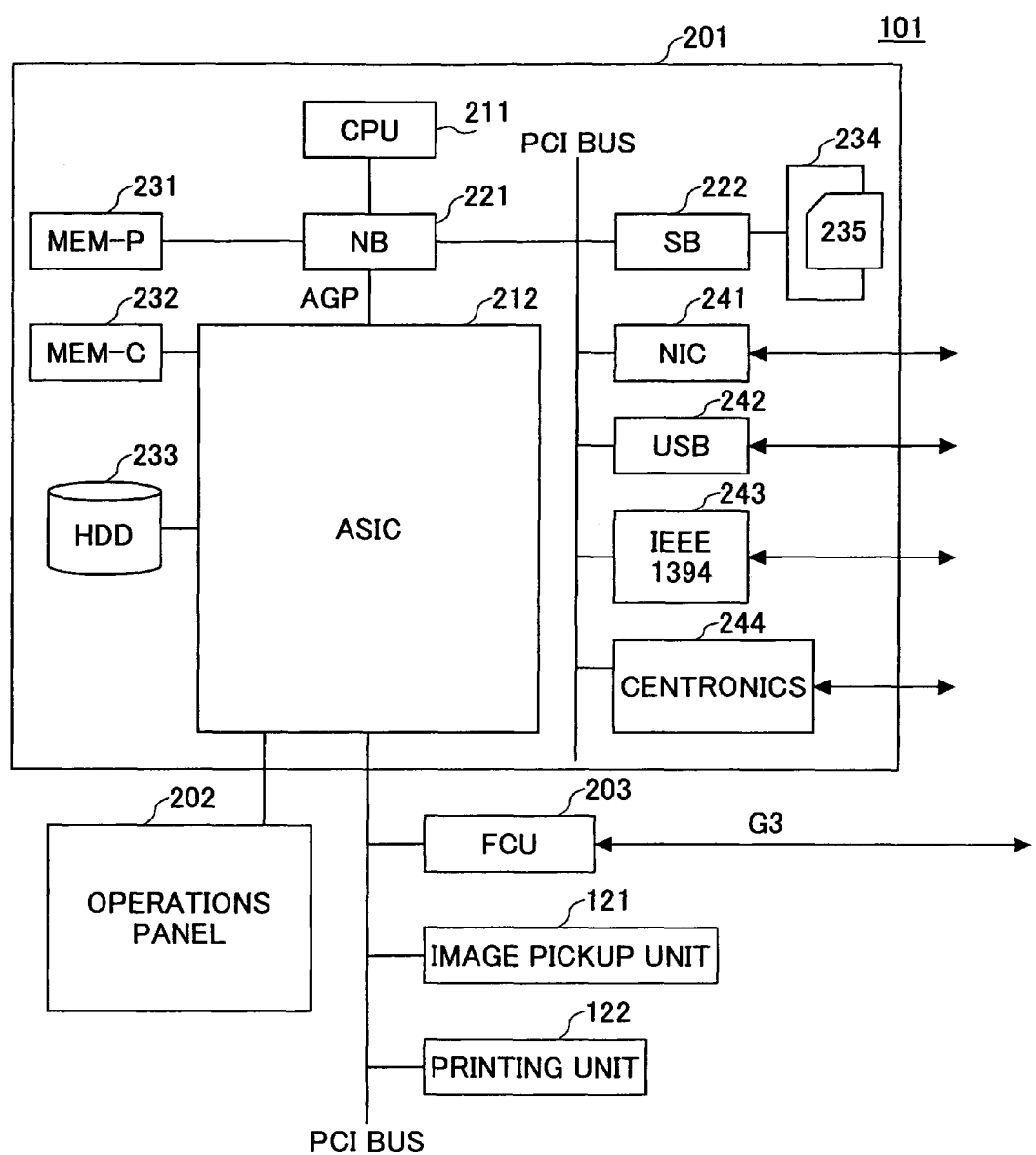
FIG. 2 is a hardware block diagram of the compound machine of FIG. 1.

FIG. 2 is a hardware block diagram of the compound machine 101 of FIG. 1. The hardware resources 111 of the compound machine 101 of FIG. 1 include a controller 201, the operations panel 202, a facsimile control unit (FCU) 203, the image pickup unit 121, and the printing unit 122.

The controller 201 includes a CPU 211, an ASIC 212, a NB 221, a SB 222, a MEM-P 231, a MEM-C 232, the HDD (hard disk drive) 233, a memory card slot 234, a NIC (network interface controller) 241, a USB device 242, an IEEE 1394 device 243, and a Centronics device 244.

The CPU 211 is an IC for processing various information items. The ASIC 212 is an IC for processing various images. The NB 221 is a north bridge for the controller 201. The SB 222 is a south bridge for the controller 201. The MEM-P 231 is a system memory of the compound machine 101. The MEM-C 232 is a system memory of the compound machine 101. The HDD 233 is a storage unit within the compound machine 101. The memory card slot 234 is for loading the memory card 235. The NIC 241 is a controller for network communications based on MAC addresses. The USB device 242 is provided with connection terminals compliant with the USB specification. The IEEE 1394 device 243 is provided with connection terminals compliant with the IEEE 1394 standard. The Centronics device 244 is provided with connection terminals compliant with Centronics specification.

The operations panel 202 serves as an operations unit with which operators input information to the compound machine 101, and also serves as a display unit for providing information from the compound machine 101 to operators.

Figure 3:
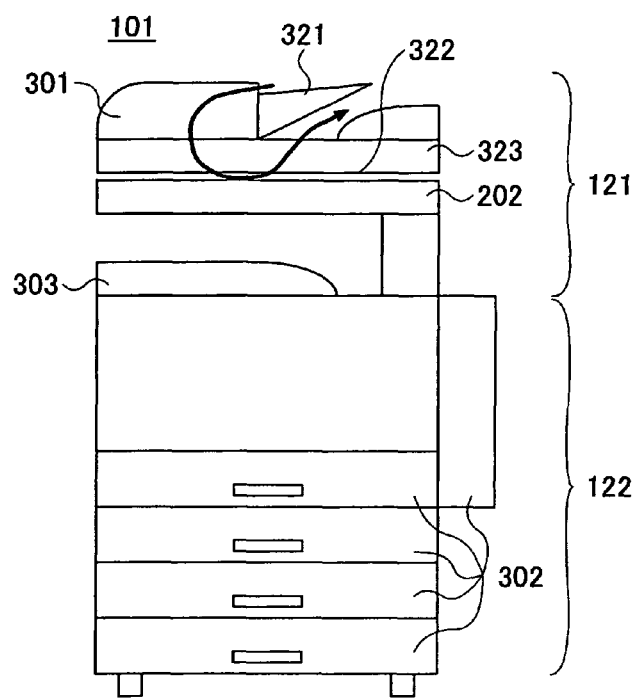
FIG. 3 is a schematic diagram illustrating the compound machine of FIG. 1.

FIG. 3 is a schematic diagram illustrating the compound machine 101 of FIG. 1. FIG. 3 shows the positions of the image pickup unit 121, the printing unit 122, and the operations panel 202. FIG. 3 further shows a document setting unit 301 on which original documents are placed, a paper feeding unit 302 for feeding printing paper, and a paper ejecting unit 303 for ejecting printing paper.

Figure 4:
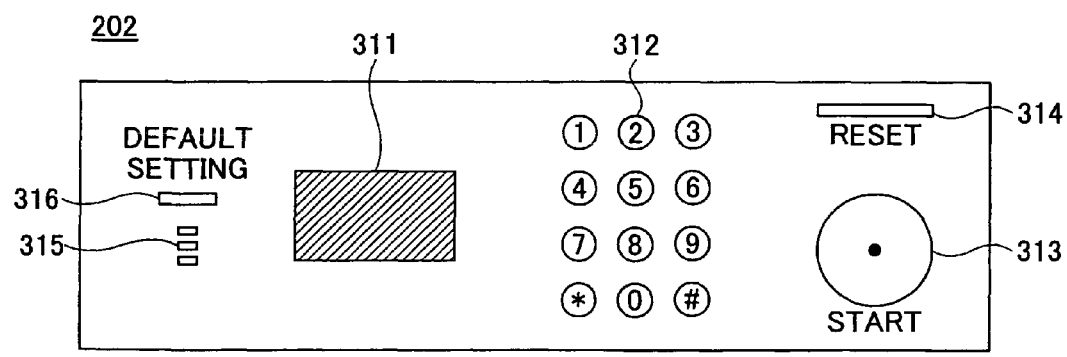
FIG. 4 is a schematic diagram illustrating an operations panel.

Referring to FIG. 4, the operations panel 202 includes a touch panel 311, numeric keys 312, a start button 313, a reset button 314, function keys 315, and a default setting button 316. The touch panel 311 serves as a touch operations section for entering information by touch, and also serves as an image display section for showing information on screen. The numeric keys 312 are for entering numbers by key (button) touch. The start button 313 is for instructing the start of an operation by button touch. The reset button 314 is for performing a reset operation by a touch of the button. The function keys 315 are for displaying operations screens provided by the CSDK application 146 and the JSDK application 147 by key (button) touch. The default setting button 316 is for displaying a default setting screen by button touch.

The document setting unit 301 includes an ADF (automatic document feeder) 321, a flat bed 322, and a flat bed cover 323. The paper feeding unit 302 includes four feeding trays. The paper ejecting unit 303 includes one ejecting tray. When using the ADF 321, original documents may be stacked and placed on the ADF 321. When using the flat bed 322, original documents are placed on the flat bed 322 with their faces down.

(JSDK)

Figure 5:
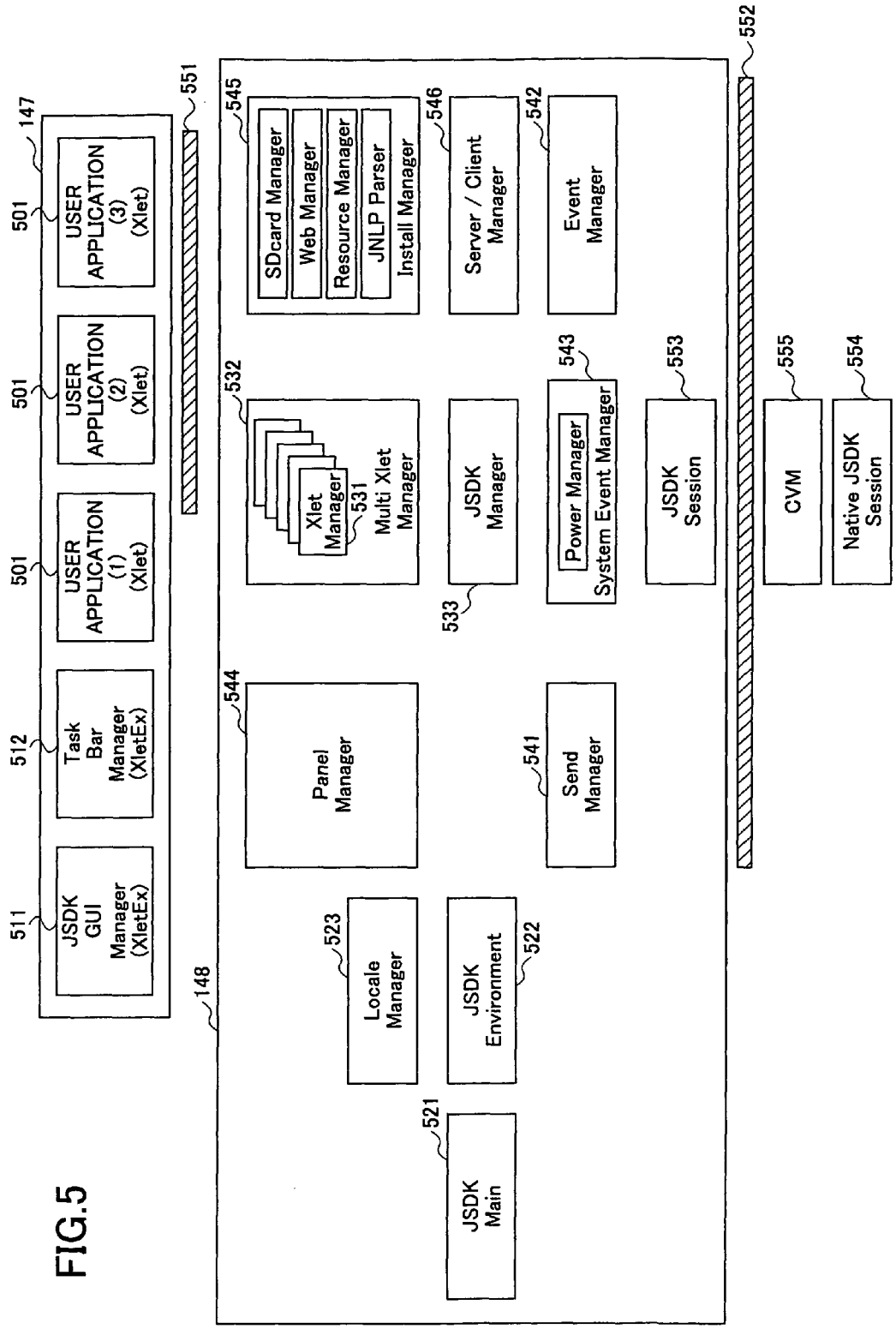
FIG. 5 is a class diagram of a JSDK application and a JSDK platform.

FIG. 5 is a class diagram of the JSDK application 147 and the JSDK platform 148. The JSDK application 147 and the JSDK platform 148 are executed as one process on the same processor. Blocks of the JSDK application 147 and the JSDK platform 148 are executed as threads of this one process, and are executed in parallel (i.e., multi-threaded) in units of threads. The JSDK application 147 and the JSDK platform 148 are translated from source code into byte code by a Java™ compiler, and are executed sequentially by a Java™ virtual machine. The JSDK application 147 and the JSDK platform 148 are based on Personal Basis Profile of Java™ 2 Micro Edition.

The JSDK application 147 includes a user application 501, a JSDK GUI manager 511, a Task Bar Manager 512, etc.

The user application 501 is a JSDK application developed by using the JSDK by a user (e.g. a software vender) of the compound machine 101. The JSDK GUI Manager 511 is a JSDK application for displaying an operations screen for operating other JSDK applications (the user application 501, etc.). The Task Bar Manager 512 is a JSDK application for displaying a task bar for operating other JSDK applications (the user application 501, etc.).

The user application 501 is a Java™ application called an Xlet, which is similar to stand-alone applications and applets. The JSDK GUI Manager 511 and the Task Bar Manager 512 are extended proprietary Xlets (XletExs).

The JSDK platform 148 includes classes such as a JSDK Main 521, a JSDK Environment 522, a Locale Manager 523, Xlet Managers 531, a Multi Xlet Manager 532, a JSDK Manager 533, a Send Manager 541, an Event Manager 542, a System Event Manager 543, a Panel Manager 544, an Install Manager 545, a Server/Client Manager 546, etc.

The JSDK Main 521 is a class for configuring startup settings of the JSDK system. The JSDK Environment 522 is a class for configuring startup environment settings of the JSDK system. The Locale Manager 523 is a class for managing locales (i.e. for specifying a language).

The Xlet Managers 531 are classes for managing life cycles of the Xlets in a one-to-one relationship. In this embodiment, five Xlet Managers 531 manage life cycles of five Xlets in a one-to-one relationship. The Multi Xlet Manager 532 is a class for managing the life cycles of all the Xlet Managers 531. In this embodiment, one Multi Xlet Manager 532 manages the five Xlet managers 531. The JSDK Manager 533 is a class for managing the life cycle of the whole JSDK system. For example, the JSDK manager 533 manages the life cycles of the Multi Xlet Manager 532, the Send Manager 541, the Event Manager 542, the System Event Manager 543, the Panel Manager 544, the Install Manager 545, and the Server/Client Manager 546.

The System Event Manager 543 is a class for managing system events (such as power mode) from the platforms 132 of FIG. 1. The Panel Manager 544 is a class for performing arbitration and the like when one Xlet occupies the screen of the operations panel 202. The Install Manager 545 is a class for managing the installation of applications from SD cards and the Web as well as uninstalling the applications.

The JSDK system of FIG. 5 includes a JSDK API 551 and a JSDK API system 552 as APIs. The difference between the Xlets and the XletExs is that the XletExs can use the JSDK API 551 for accessing objects and can access the JSDK platform 148. In addition, the compound machine 101 of FIG. 1 includes, as elements related to the JSDK system of FIG. 5, a JSDK Session 553 and a Native JSDK Session 554 that are interfaces between C and Java™ languages. The compound machine 101 of FIG. 1 further includes, as an element related to the JSDK system of FIG. 5, a CVM (compact virtual machine) 555 that is a Java™ virtual machine for sequentially executing Java™ programs translated from source code into byte code by Java™ compilers.

(Startup Control of JSDK Application)

The following first describes models and versions of image forming apparatuses and applications for the image forming apparatuses, and then describes startup control of the JSDK application 147.

Figure 6:
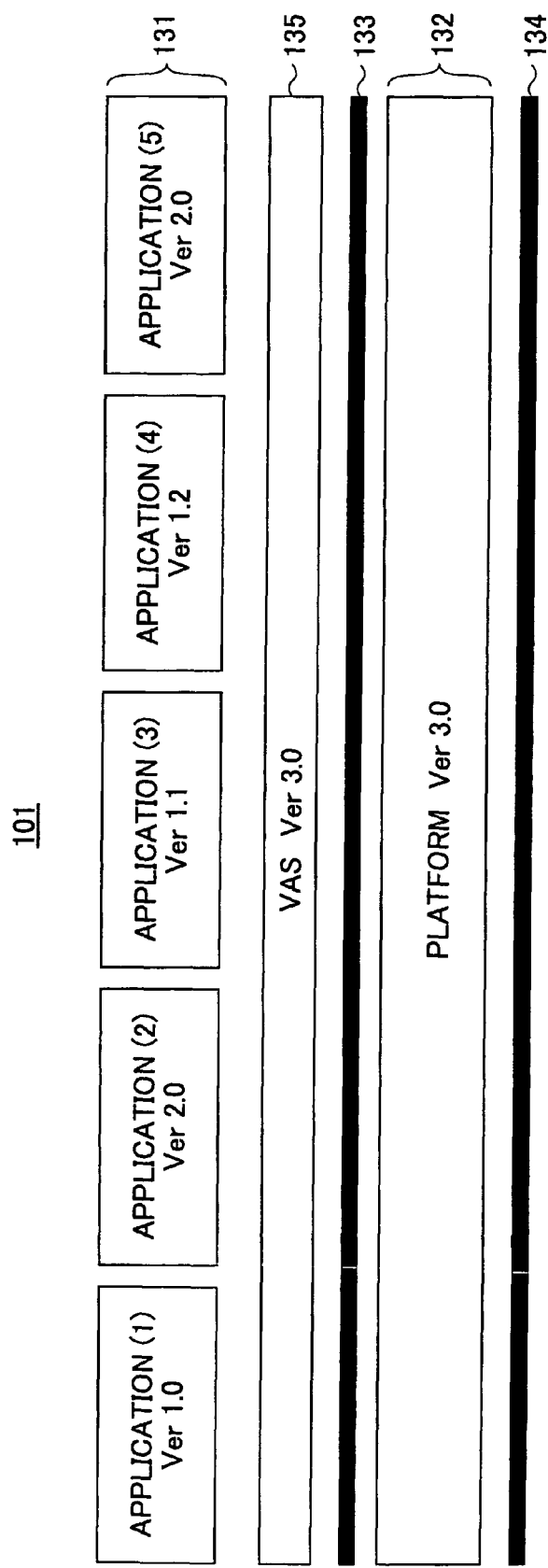
FIG. 6 is a diagram for explaining models and versions of an image forming apparatus and an application for the image forming apparatus.

The models and versions of image forming apparatuses and applications for the image forming apparatuses are described with reference to FIG. 6. The image forming apparatuses are available in various models, such as office use color compound machines, personal use monochrome compound machines, office use digital printers, and personal use analog printers. The compound machine 101 of FIG. 1 is one model of an image forming apparatus which is available in various models. The application 131 and the platform 132 of the compound machine 101 are available in various versions such as Ver. 1.0, Ver. 1.1, Ver. 1.2, Ver. 2.0, and Ver. 3.0.

When upgrading the version of the platform 132 of the compound machine 101, a situation in which the application 131 that has been compatible with the platform 132 before the version upgrade becomes incompatible with the platform 132 after the version upgrade should be avoided. In order to avoid such a situation, when the platform 132 of the compound machine 101 is upgraded, the version of the VAS 135 of the compound machine 101 is also upgraded such that the VAS 135 compensates for the version difference of the platform 132 before and after the version upgrade. It is to be noted that the version of the compound machine 101 corresponds to the version of the VAS 135 of the compound machine 101.

(1) First Embodiment

Figure 7:
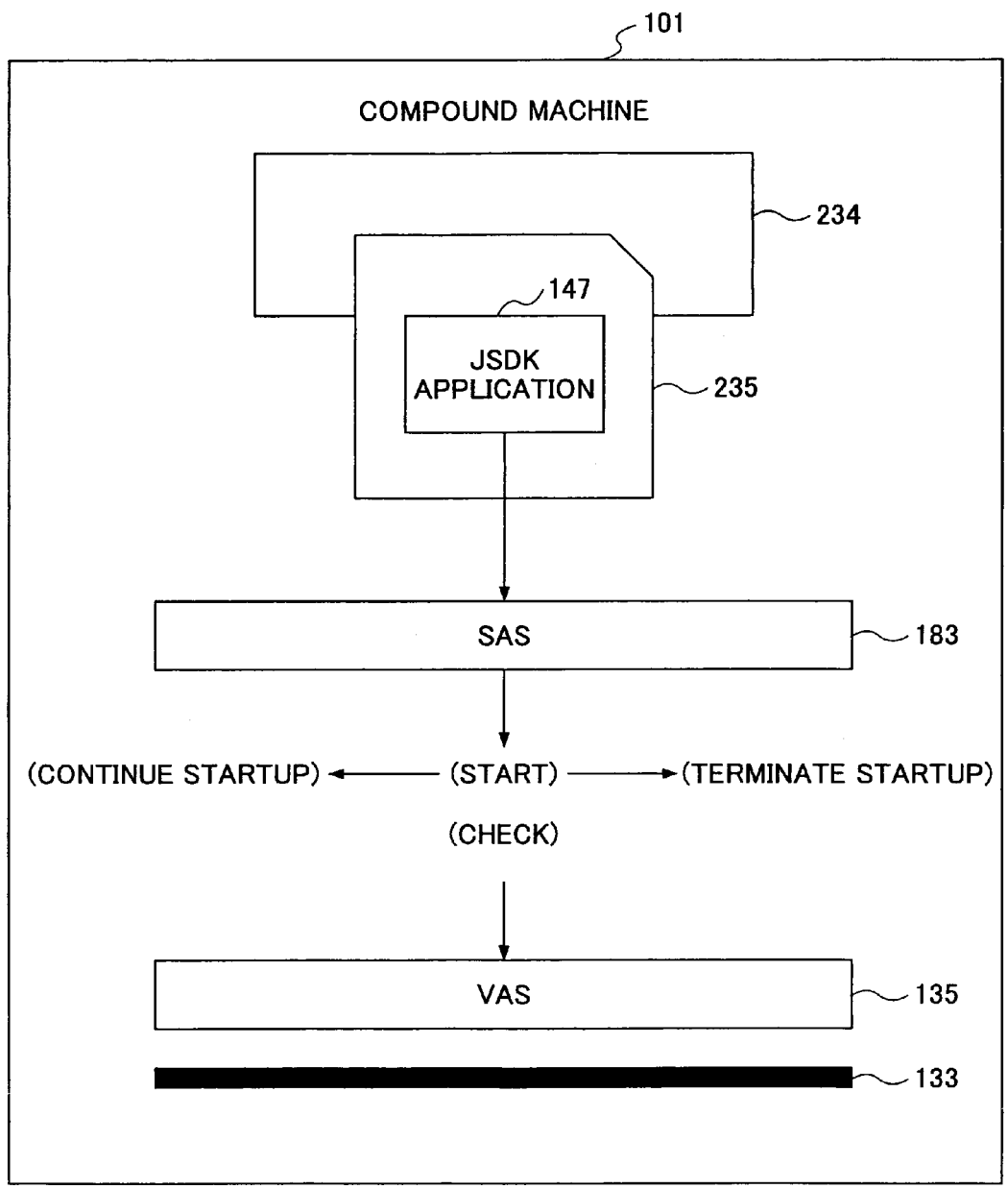
FIG. 7 is a diagram for explaining startup control of a JSDK application according to a first embodiment.

FIG. 7 is a diagram for explaining startup control of the JSDK application 147 according to a first embodiment.

In the first embodiment, the JSDK application 147 of FIG. 7 is illustrated as an example. The JSDK application 147 of FIG. 7 is held in the SD memory card 235 loaded in the SD memory card slot 234. The SAS 183 can start the JSDK application 147 of FIG. 7 in the compound machine 101 from the SD memory card 235 loaded in the SD memory card slot 234.

The JSDK application 147 of FIG. 7 is available in Ver. 1.0, Ver. 1.1, Ver. 1.2, Ver. 2.0, and Ver. 3.0. The JSDK application 147 of FIG. 7 is Ver. 2.0. The version of the VAS 135 that matches the version "Ver. 2.0" of the JSDK application 147 of FIG. 7 is "Ver. 3.0". Accordingly, if the version of the VAS 135 is Ver. 3.0 or higher, since the version of the VAS 135 is compatible with the version of the JSDK application 147, the JSDK application 147 works properly. However, if the version of the VAS 135 is lower than Ver. 3.0, since the version of the VAS 135 is not compatible with the version of the JSDK application 147, the JSDK application 147 does not work properly.

In this embodiment, upon starting the JSDK application 147 of FIG. 7 in the compound machine 101, the JSDK application 147 of FIG. 7 checks the version thereof against the version of the compound machine 101 (i.e. the version of the VAS 135 of the compound machine 101). If the version of the JSDK application 147 is compatible with the version of the compound machine 101, the JSDK application 147 continues the startup of the JSDK application 147. If the version of the JSDK application 147 is not compatible with the version of the compound machine 101, the JSDK application 147 terminates the startup of the JSDK application 147.

In other words, if the version of the compound machine 101 matches the version of the JSDK application 147 or is newer than the version that matches the version of the JSDK application 147, the JSDK application 147 continues the startup. If the version of the compound machine 101 is older than the version that matches the version of the JSDK application 147, the JSDK application 147 terminates the startup.

Since the JSDK application 147 itself determines whether the compound machine 101 is compatible with the JSDK application 147 and terminates the startup if the compound machine 101 is not compatible with the JSDK application 147 as described above, problems due to incompatibility between the JSDK application 147 and the compound machine 101 can be prevented. The startup control is performed not by the compound machine side but by the application side. That is, responsibility of providing measures for the startup control is transferred from compound machine manufacturers to application vendors.

The following describes an API (application program interface) 133 of the compound machine 101. In the compound machine 101 of FIG. 1, when the applications 131 send processing requests to and receive processing requests from the platforms 132, the API 133 is used that accepts the processing requests by using functions defined in advance. The API 133 of the compound machine 101 includes hundreds of types of APIs. In order to ensure upward compatibility of the compound machine 101, the compound machine 101 of FIG. 1 adds APIs but does not delete APIs upon version upgrades of the compound machine 101. Accordingly, the JSDK application 147 becomes compatible with the compound machine 101 whose version matches the version of the JSDK application 147 or is higher than the version that matches the version of the JSDK application 147, but becomes incompatible with the compound machine 101 whose version is lower than the version that matches the version of the JSDK application 147.

FIG. 8 is a diagram for explaining the startup control of the JSDK application 147 according to the first embodiment.

When the compound machine 101 is powered on (S11), the compound machine starting unit 113 starts the SAS 183 (S12). The SAS 183 starts the CVM 555 (S13). The SAS 183 then starts the JSDK application 147 by using the CVM 555 (S14). The JSDK application 147 acquires information of the version of the VAS 135 of the compound machine 101 from the VAS 135, in which the information of the version of the VAS 135 is held (S15). Then, the JSDK application 147, in which information of the version thereof is held, checks the version thereof against the version of the VAS 135 of the compound machine 101 (S16). If the version of the JSDK application 147 is compatible with the version of the VAS 135 of the compound machine 101 (S17), the JSDK application 147 continues the startup of the JSDK application 147 (S18). If the version of the JSDK application 147 is not compatible with the version of the VAS 135 of the compound machine 101 (S17), the JSDK application 147 terminates the startup of the JSDK application 147 (S19).

(2) Second Embodiment

Figure 9A:
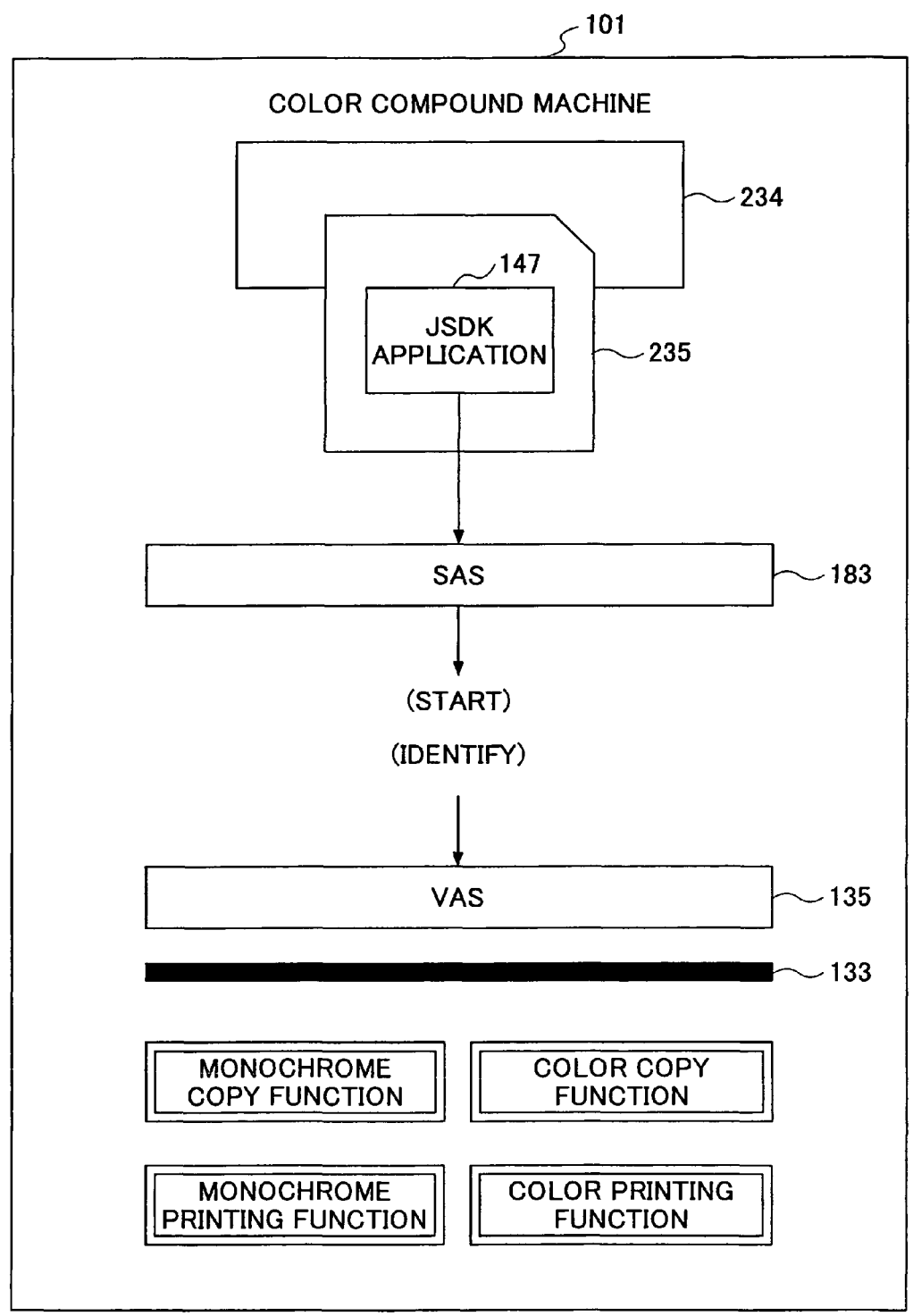
FIGS. 9A and 9B are diagrams for explaining startup control of a JSDK application according to a second embodiment.
Figure 9B:
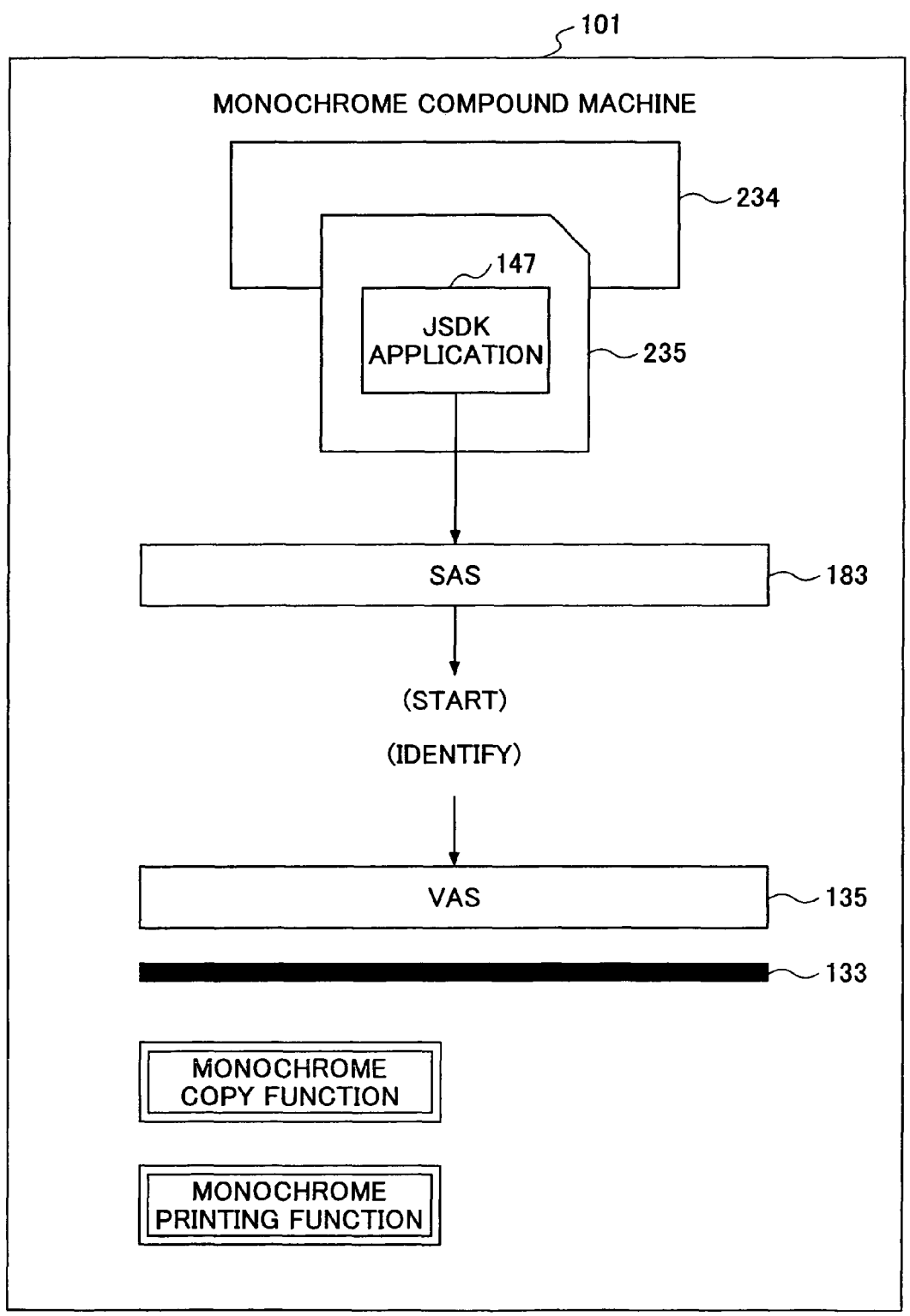

FIGS. 9A and 9B are diagrams for explaining startup control of the JSDK application 147 according to a second embodiment.

In the second embodiment, the JSDK applications 147 of FIGS. 9A and 9B are illustrated as examples. In each of the compound machines 101 of FIGS. 9A and 9B, the JSDK application 147 is held in the SD memory card 235 loaded in the SD memory card slot 234. The SAS 183 can start the JSDK application 147 in the compound machine 101 from the SD memory card 235 loaded in the SD memory card slot 234.

Although both the compound machine 101 of FIG. 9A and the compound machine of FIG. 9B correspond to the compound machine 101 of FIG. 1, the compound machine 101 of FIG. 9A and the compound machine of FIG. 9B are different models. The compound machine 101 of FIG. 9A is a color compound machine, whereas the compound machine 101 of FIG. 9B is a monochrome compound machine. Accordingly, the types of supported functions are different between the compound machine 101 of FIG. 9A and the compound machine of FIG. 9B. Roughly, the compound machine 101 of FIG. 9A supports a monochrome copy function, a color copy function, a monochrome printing function, a color printing function, etc., whereas the compound machine 101 of FIG. 9B supports a monochrome copy function, a monochrome printing function, etc. In other words, the compound machine 101 of FIG. 9A supports monochrome APIs and color APIs, etc., whereas the compound machine 101 of FIG. 9B supports monochrome APIs, etc. Accordingly, if the JSDK applications 147 of FIGS. 9A and 9B attempt to use color functions in the corresponding compound machines 101 of FIGS. 9A and 9B, the JSDK application of FIG. 9A works properly, but the JSDK application of FIG. 9B does not work properly.

In this embodiment, in each of the compound machines 101 of FIGS. 9A and 9B, when the JSDK application 147 is started, the JSDK application 147 identifies the types of the functions supported by the compound machine 101, and uses only the function supported by the corresponding compound machine 101 while avoiding use of the functions not supported by the compound machine 101.

Since the JSDK application 147 itself identifies the types of the functions supported by the compound machine 101 and avoids use of the functions not supported by the compound machine 101 as described above, problems due to incompatibility between the JSDK application 147 and the compound machine 101 can be prevented. The JSDK application 147 executes only portions compatible between the compound machine 101 and the JSDK application 147 while avoiding execution of portions incompatible between the compound machine 101 and the JSDK application 147. The startup control (control on use of functions upon startup) is performed not by the compound machine side but by the application side. That is, responsibility of providing measures for the startup control is transferred from compound machine manufacturers to application vendors.

It is to be noted that, in each of the compound machines 101 of FIGS. 9A and 9B, the JSDK application 147 does not determine whether the compound machine 101 supports "standard functions", which all the models of the image forming apparatus support, but only determines whether the compound machine 101 supports "extended functions", which not all the models of the image forming apparatus support.

Classification between the standard functions and the extended functions may be arbitrarily defined. For example, if the models of the image forming apparatus include monochrome compound machines, color compound machines, monochrome printers, and color printers, the "standard function" may be a monochrome printing function while the "extended functions" may be a color printing function, a monochrome copy function, a color copying function, a touch panel function, and a storage function.

Optionally, in this embodiment, in the case of avoiding use of the functions not supported by the compound machine 101, the JSDK application 147 may change the user interface accordingly. For example, in the case of avoiding use of the color copy function, a color copy screen and a color copy start button may be hidden. Alternatively, an error message may be displayed when the color copy screen or the color copy start button is used.

FIG. 10 is a flowchart for explaining the startup control of the JSDK application 147 according to the second embodiment.

When the compound machine 101 is powered on (S21), the compound machine starting unit 113 starts the SAS 183 (S22). The SAS 183 starts the CVM 555 (S23). The SAS 183 then starts the JSDK application 147 by using the CVM 555 (S24). The JSDK application 147 acquires information of functions supported by the compound machine 101 from the VAS 135, in which a list that shows the model names of the image forming apparatus together with types of functions supported by each model is held (S25). The JSDK application 147 identifies the types of the functions supported by the compound machine 101 (S26). The JSDK application 147 does not avoid use of the functions supported by the compound machine 101 (S27, S28), but avoids use of the functions not supported by the compound machine 101 (S27, S29).

(3) Third Embodiment

Figure 11:
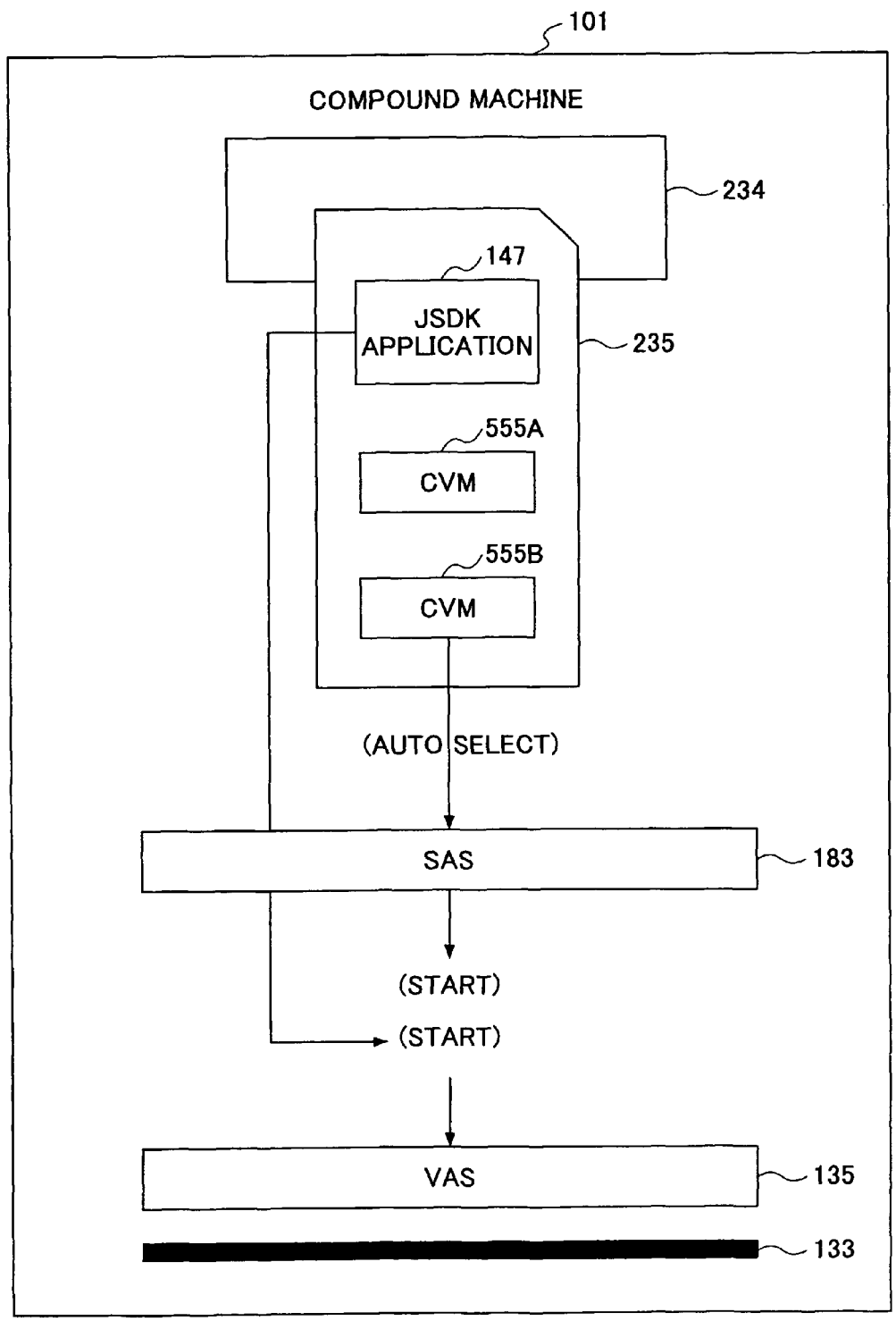
FIG. 11 is a diagram for explaining startup control of a JSDK application according to a third embodiment.

FIG. 11 is a diagram for explaining startup control of the JSDK application 147 according to a third embodiment.

In the third embodiment, the JSDK application 147, a CVM 555A, and CVM 555B of FIG. 11 are illustrated as examples. The JSDK application 147, the CVM 555A, and the CVM 555B of FIG. 11 are stored in the SD memory card 235 loaded in the SD memory card slot 234. The SAS 183 can start the JSDK application 147, the CVM 555A, and the CVM 555B of FIG. 11 in the compound machine 101 from the SD memory card 235 loaded in the SD memory card slot 234.

In this embodiment, the models of the image forming apparatus are managed as "model groups" such as "a 2004 second half model group", "a 2005 first half model group", and "a 2005 second half model group". Such management allows development of the image forming apparatus on a per-model group basis. Java™ execution environments are changed on the per-model group basis. Accordingly, in this embodiment, the versions of the CVM 555 are classified according to the model groups, such as CVMs for the 2004 second half model group, CVMs for the 2005 first half model group, and CVMs for the 2005 second half model group.

The present inventor is studying a business model for selling the SD memory cards 235 each storing the JSDK application 147, the JSDK platform 148, and the CVM 555. A concern with this business model is model group dependency of the CVM 555. This is because, if an SD memory card 235 for a new model group storing a CVM 555 for the new model group is released upon every new model group release, there will be a necessity of supplying N types of SD memory cards 235 after N types of model groups are released.

In view of the above, in the third embodiment, when a new model group is released, a SD memory card 235 storing a CVM 555 for the new model group and all the CVMs 555 that have been released before the release of the new model group is released such that the SD memory card 235 can be shared by all the model groups.

In the third embodiment, the SAS 183 automatically selects the CVM 555 whose version supports the model (model group) of the compound machine 101 from plural versions of the CVMs 555 stored in the SD memory card 235 and starts the selected CVM 555 in the compound machine 101.

According to the third embodiment, since only the SD memory card 235 released upon a release of a new model group needs to be supplied after the release of the new model as described above, the necessity of supplying plural types of SD memory cards 235 is eliminated. Moreover, according to the third embodiment, since the SD memory card 235 is shared by all the model groups, there is no risk of selecting a wrong SD memory card 235. Therefore, problems due to incompatibility between the compound machine 101 and the JSDK application 147 (SD memory card 235) can be prevented.

The example of FIG. 11 is described in greater detail by way of illustration. The CVM 555A and the CVM 555B of FIG. 11 correspond to the CVM for the 2004 second half model group and the CVM for the 2005 first half model group, respectively. That is, the SD memory card 235 of FIG. 11 corresponds to the SD memory card 235 that is released upon the release of the 2005 first half model group. The compound machine 101 of FIG. 11 corresponds to an image forming apparatus belonging to the 2005 first half model group. The SAS 183 automatically selects one of the CVM 555s, i.e., "the CVM for the 2005 first half model group", whose version supports the model group, i.e., "the 2005 first half model group", of the compound machine 101 from plural versions of the CVMs 555 stored in the SD memory card 235, and starts the selected CVM 555 in the compound machine 101.

Figure 12:
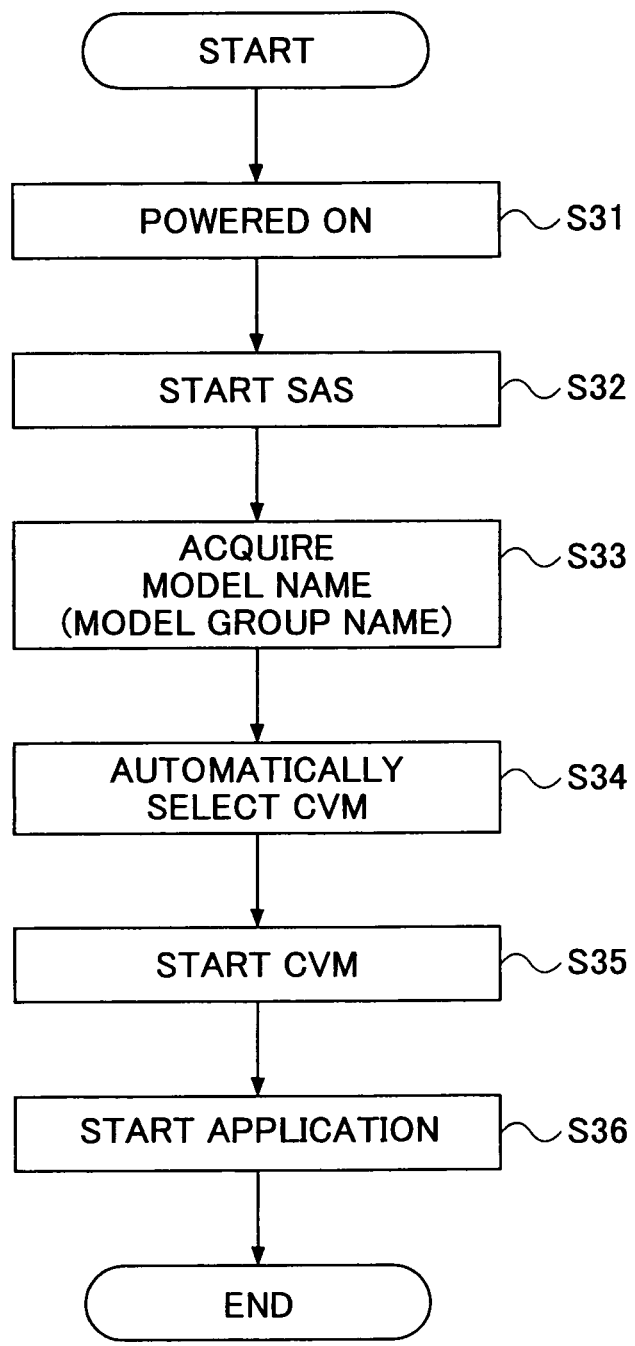
FIG. 12 is a flowchart illustrating the startup control of the JSDK application according to the third embodiment.

FIG. 12 is a flowchart for explaining the startup control of the JSDK application 147 according to the third embodiment.

When the compound machine 101 is powered on (S31), the compound machine starting unit 113 starts the SAS 183 (S32). The SAS 183 acquires information of the model name of the compound machine 101 from the VAS 135, in which the information of the model name (model group name) of the compound machine 101 is held (S33). The SAS 183 automatically selects the CVM 555 whose version supports the model (model group) of the compound machine 101 from plural versions of the CVMs 555 stored in the SD memory card 235 (S34), and starts the selected CVM 555 in the compound machine 101 (S35). The SAS 183 starts the JSDK application 147 in the compound machine 101 from the SD memory card 235 by using the automatically selected and started CVM 555 (S36).

(3) Fourth Embodiment

Figure 13:
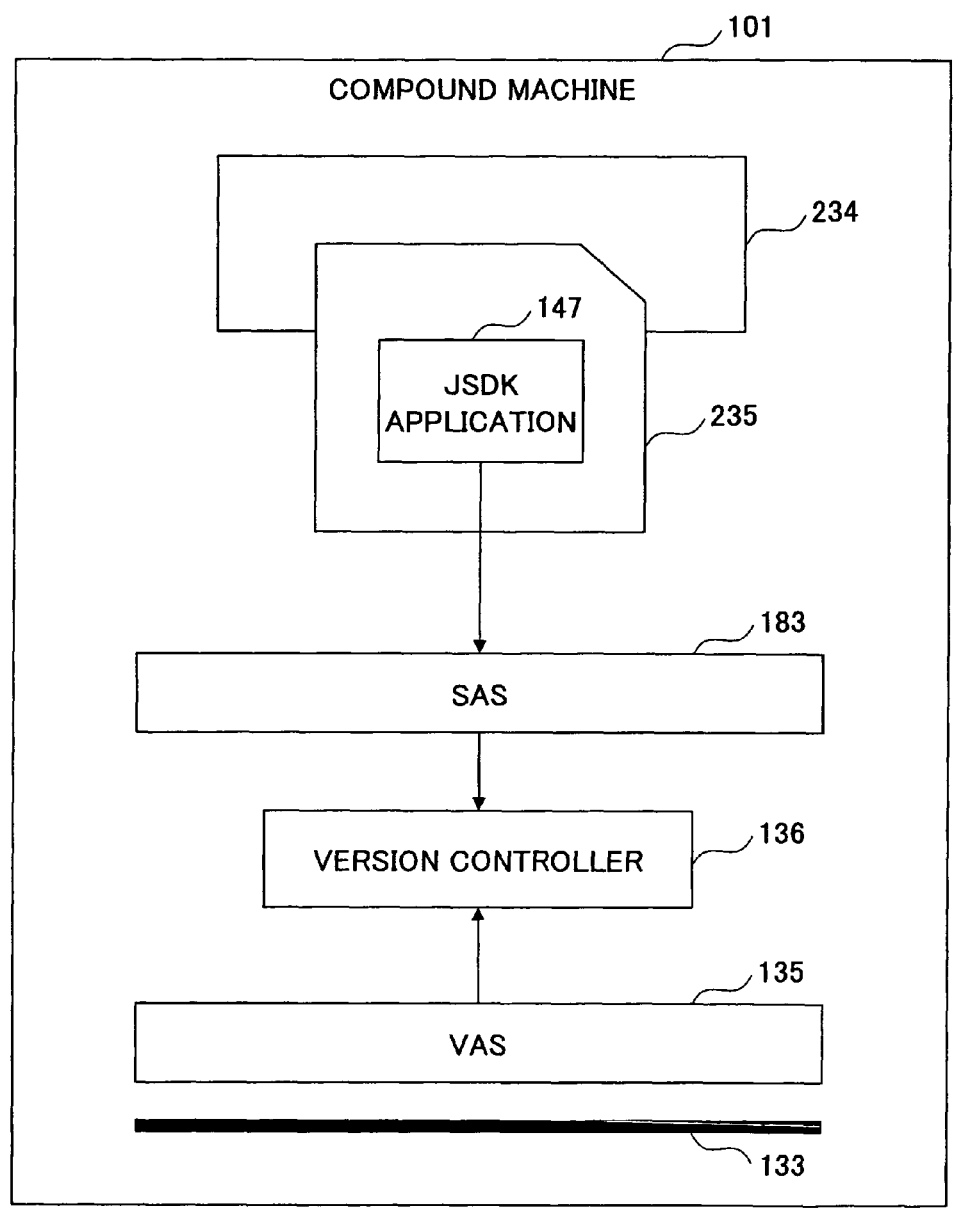
FIG. 13 is a diagram for explaining startup control of a JSDK application according to a fourth embodiment.

FIG. 13 is a diagram for explaining startup control of the JSDK application 147 according to a fourth embodiment.

In the first embodiment, the JSDK application 147, a version controller 136, etc., of FIG. 13 are illustrated as examples. The JSDK application 147 of FIG. 13 is held in the SD memory card 235 loaded in the SD memory card slot 234. The version controller 136 is a program for resolving inconsistencies between the functions to be used by the JSDK application 147 and the functions supported by the compound machine 101, and is held in a rewritable recording medium such as the SD memory card 235, a USB memory (not shown), a flash memory (not shown), the HDD 233, or a recording medium in another computer connected via a network such as an intranet or the Internet. The version controller 136 is updatable. The SAS 183 can start the JSDK application 147, the version controller 136, etc., in the compound machine 101.

Figure 14:
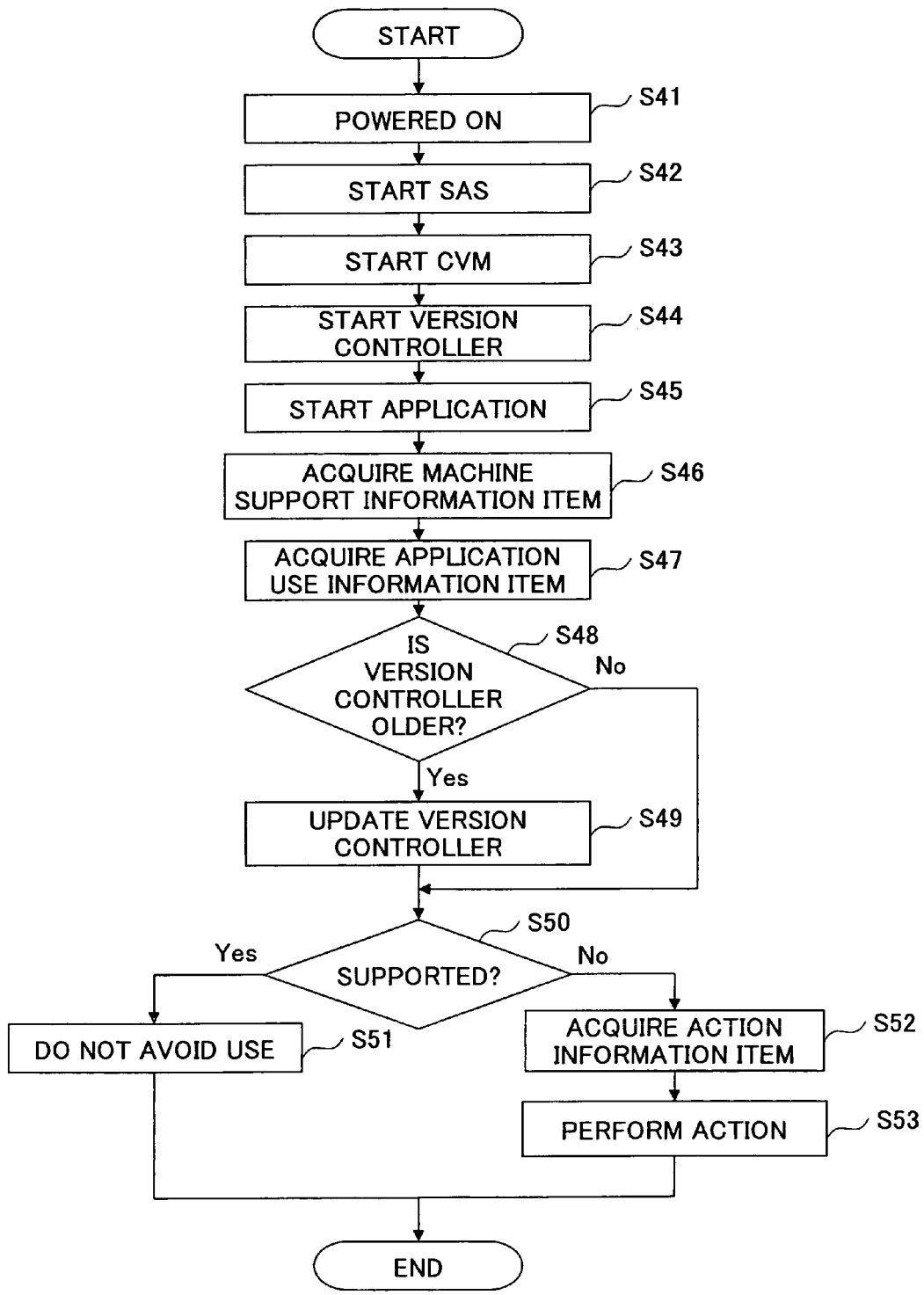
FIG. 14 is a flowchart illustrating the startup control of the JSDK application according to the fourth embodiment.

FIG. 14 is a flowchart for explaining the startup control of the JSDK application 147 according to the fourth embodiment.

When the compound machine 101 is powered on (S41), the compound machine starting unit 113 starts the SAS 183 (S42). The SAS 183 starts the CVM 555 and the version controller 136 (S43, S44). The SAS 183 then starts the JSDK application 147 by using the CVM 555 (S45).

The version controller 136 acquires information (hereinafter referred to as a "machine support information item") of functions supported by the compound machine 101 from the VAS 135 of the compound machine 101 (S46). The JSDK application 147 also acquires information (hereinafter referred to as an "application use information item") of functions to be used by the JSDK application 147 from the JSDK application (S47).

FIG. 15 shows an example of a machine support information item 600. Although the machine support information item 600 illustrated in FIG. 15 is written in an XML format, the machine support information item 600 may alternatively be written in other suitable formats.

In the machine support information item 600, an "inf_version" element 601 indicates a version (hereinafter referred to as a "machine support information item version") ("1.2") of the grammar (structure) used by the machine support information item 600. A "function_list" element 602 shows a list of the functions supported by the compound machine 101. The list contains version information of each function. For example, a "copy" element 6021 indicates the version ("1.03") of the copy application 141 currently installed in the compound machine 101. A "CVM" element 6024 indicates the version ("1.01") of the CVM 555 currently installed in the compound machine 101.

FIG. 16 shows an example of an application use information item 700.

The application use information item 700 of FIG. 16 uses the same grammar (structure) as the machine support information item 600 of FIG. 15. In the application use information item 700, an "inf_version" element 701 indicates a version (hereinafter referred to as an "application use information item version") ("1.3") of the grammar (structure) used by the application use information item 700. A "function_list" element 702 shows a list of the functions to be used by the JSDK application 147 and the versions of the functions. For example, a "CVM" element 7021 indicates the version ("1.02") of the CVM 555 to be used by the JSDK application 147.

Then, the version controller 136 determines, based on the machine support information item version and the application use information item version, whether the version controller 136 can read the machine support information item 600 and the application use information item 700 (S48). This determination operation is performed because there is a possibility that the grammars (structures) of the machine support information item 600 and the application use information item 700 are updated due to expansion or the like, and tags and the like unreadable by the version controller 136 might be added. In this embodiment, as the application use information item version is newer, the version controller 136 needs to be able to read the application use information item version ("1.3") or higher. It is to be noted that a version readable by the version controller 136 is incorporated in the version controller 136. If the incorporated version is older than at least one of the machine support information item version and the application use information item version (Yes in S48), the version controller 136 determines that the version controller 136 is older than the machine support information item version or the application use information item version, and reports this fact to the SAS 183. Upon reception of the report, the SAS 183 downloads a version controller 136 that supports the machine support information item version and the application use information item version from, e.g., a predetermined server via a network. Thus, the version controller 136 is automatically updated (S49). Alternatively, the version controller may be updated manually by a user. In the case of manual update, instructions from the user are entered via the operations panel 202, Web pages, or the like.

The process proceeds from Step S48 or Step S49 to Step S50, in which the version controller 136 checks the application use information item 700 against the machine support information item 600 so as to determine whether the functions to be used by the JSDK application 147 are supported by the compound machine 101. For example, if a function listed in the application use information item 700 is listed in the machine support information item 600, and if the version of this function of the compound machine 101 is the same as or newer than the version of this function to be used by the JSDK application 147, the version controller 136 determines that this function is supported by the compound machine 101. Then, the JSDK application 147 does not avoid use of this function (S51).

Otherwise, if a function listed in the application use information item 700 is not listed in the machine support information item 600, or if the version of this function of the compound machine 101 is older than the version of this function to be used by the JSDK application 147, the version controller 136 determines that this function is not supported by the compound machine 101. Then, the process proceeds to Step S52, in which the version controller 136 acquires an action information item from a recording medium in the compound machine 101.

FIG. 17 shows an example of an action information item 800.

In the action information item 800 of FIG. 17, an action to be performed when there is a difference between the application use information item 700 and the machine support information item 600 is defined. An "action_list" element 801 of the action information item 800 defines actions to be performed on a per-function basis as "action" elements.

For instance, the value of the "action" element of a "copy" element 8012 and a "CVM" element 8013 is "update". The value "update" indicates that the version of the corresponding function of the compound machine 101 should be updated to match the version of this function to be used by the JSDK application 147 by updating a program for this function by download or the like. Information for identifying the download source may be added, although such information is not contained in the example of FIG. 17 for purposes of simplicity of illustration. The value of the "action" element of a "scan" element 8012 is "ignore". The value "ignore" indicates that, for example, even if there is an incompatibility with the JSDK application 147, no update is to be performed in the compound machine 101, thereby limiting functions of the JSDK application 147.

The process proceeds from Step S52 to Step S53, in which the action defined in the action information item 800 is performed.

Upon updating a function of the compound machine 101 according to the action information item 800, the version controller 136 may update processes with which the function to be updated has dependency relationships according to an information item (hereinafter referred to as a "process dependency information item") indicating dependency relationships between processes.

Figure 18:
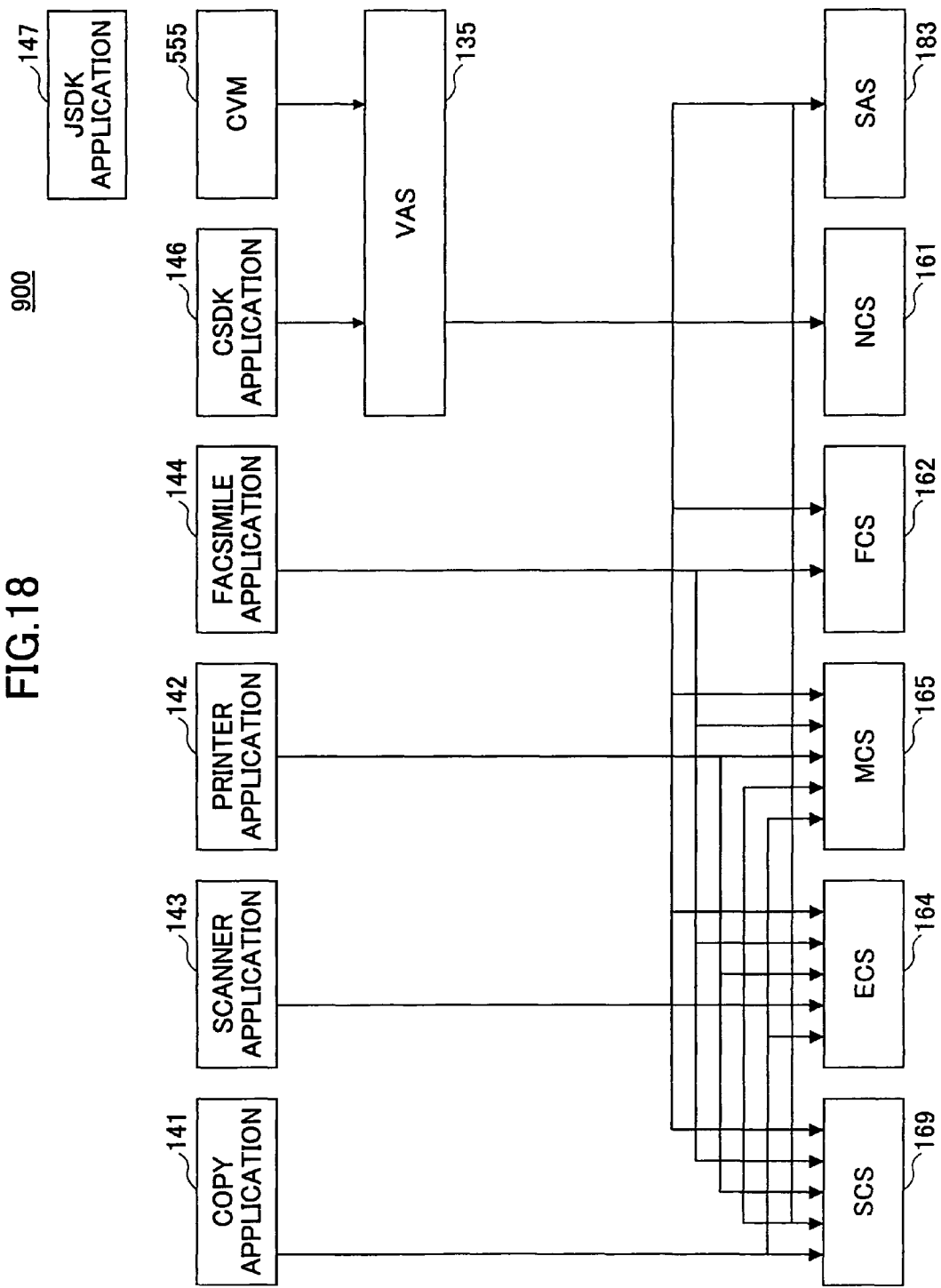
FIG. 18 is a diagram conceptually illustrating a process dependency information item.

FIG. 18 is a diagram conceptually illustrating a process dependency information item 900.

The process dependency information item 900 of FIG. 18 indicates that processes (functions) from which arrows originate are dependent on processes (functions) to which the arrows point. For example, the copy application 141 is dependent on the SCS 169 and the MCS 165. The CVM 555 is dependent on the VAS 135. While the process dependency information item 900 is conceptually represented as a tree structure in FIG. 18, the tree structure may be represented in an XML format. When a dependency relationship is updated due to update of a process (function) the process dependency information item 900 may preferably be updated. For this purpose, information for identifying processes with which each process has a dependency relationship may be added.

The following describes a mechanism for the version controller 136 to acquire the application use information item 700 from the JSDK application 147 in Step S47. Generally, when a source file with an extension ".java" for a Java™ program is compiled, a class file with an extension ".class" is generated for each class defined in the source file. One or more class files generated from the source file are archived on a per-function basis, so that jar files with extensions ".jar" are generated. Each jar file has a mechanism for managing version information at the jar file level. The application use information item 700 may be generated based on this version information at the jar file level. However, with the version information at the jar file level, the version of each class contained in the jar file cannot be identified. If versions need to be identified at the class level, a class indicating the version of each class may be defined separately and be stored in the jar file in advance. Thus, the version of each class can be identified by accessing the class indicating the version from outside the jar file. That is, application use information items 700 in smaller units can be created.

As described above, in the compound machine 101 of the fourth embodiment, an entity (version controller 136) that determines consistency between functions to be used by applications and functions supported by the compound machine 101 is updatable. Therefore, even if a protocol (the application use information item 700, the machine support information item 600, etc.) required for determining the consistency is updated, a flexible response can be provided by updating the version controller 136. If there is a function not supported by the compound machine 101, the function can be added or updated to the extent possible. Therefore, more convenient services can be provided to users. Moreover, if there is a function not supported by the compound machine 101, an action to be performed is determined based on the action information item 800. Therefore, a flexible response appropriate for each function can be provided.

The present application is based on Japanese Priority Applications No. 2005-102852 filed on Mar. 31, 2005, and No. 2006-055026 filed on Mar. 1, 2006, with the Japanese Patent Office, the entire contents of which are hereby incorporated by reference.

What is claimed is:

1. An image forming apparatus including a program, comprising:
   a determining unit that, when the program starts in the image forming apparatus, checks first information indicating a function of a plurality of functions to be used by the program and indicating a version of the function against second information indicating a function of a plurality of functions supported by the image forming apparatus and indicating a version of the function supported by the image forming apparatus, determines that the function to be used by the program is enabled on the image forming apparatus in response to a determination that the function to be used by the program is supported by the image forming apparatus, and changes operations of the program in response to a determination that the function to be used by the program is not supported by the image forming apparatus; and
   an automatic updating device which automatically updates the determining unit in response to a determination by the determining unit that the image forming apparatus does not support the function to be used by the program,
   wherein the program identifies functions supported by the image forming apparatus, and the image forming apparatus avoids use of functions of the program not supported by the image forming apparatus, during operation of the program.

2. The image forming apparatus as claimed in claim 1, wherein if there is an inconsistency between the first information and the second information, the determining unit changes the operations of the program according to definition information defining an action against incompatibility on a per-function basis.

3. The image forming apparatus as claimed in claim 1, wherein the automatic updating device updates the function supported by the image forming device when there is an inconsistency between the first information and the second information.

4. The image forming apparatus as claimed in claim 1, wherein if there is an inconsistency between the first information and the second information, the determining unit limits functions of the program.

5. An information processing method to be performed by an image forming apparatus including a program, the method comprising:
   checking, when the program starts in the image forming apparatus, first information indicating a function of a plurality of functions to be used by the program and indicating a version of the function against second information indicating a function of a plurality of functions supported by the image forming apparatus and indicating a version of the function supported by the image forming apparatus, determining that the function to be used by the program is enabled on the image forming apparatus in response to a determination that the function to be used by the program is supported by the image forming apparatus, and changing operations of the program according to a determination that the function to be used by the program is not supported by the image forming apparatus; and
   automatically updating information used by the determining in response to a determination by the determining that the image forming apparatus does not support the function to be used by the program,
   wherein the program identifies functions supported by the image forming apparatus, and the image forming apparatus avoids use of functions of the program not supported by the image forming apparatus, during operation of the program.

6. A non-transitory computer-readable medium having a program embodied therein, the program causing an image forming apparatus including the program to execute:
   checking, when the program starts in the image forming apparatus, first information indicating a function of a plurality of functions to be used by the program and indicating a version of the function against second information indicating a function of a plurality of functions supported by the image forming apparatus and indicating a version of the function supported by the image forming apparatus, determining that use of the function to be used by the program is enabled on the image forming apparatus in response to a determination that the function to be used by the program is supported by the image forming apparatus, and changing operations of the program according to a determination result; and automatically updating information used by the determining in response to a determination by the determining that the image forming apparatus does not support the function to be used by the program, wherein the program identifies functions supported by the image forming apparatus, and the image forming apparatus avoids use of functions of the program not supported by the image forming apparatus, during operation of the program.

7. An image forming apparatus comprising:

an image forming unit; and a startup controlling unit to start a program and a virtual machine in the image forming apparatus loaded from a recording medium storing the program and the virtual machine, the virtual machine to sequentially execute programs translated by a compiler, wherein upon starting the program in the image forming apparatus from the recording medium storing the program, the startup controlling unit starts the program which automatically selects the virtual machine whose version is compatible with the image forming apparatus from a plurality of the virtual machines stored in the recording medium, and starts the selected virtual machine in the image forming apparatus, wherein the program acquires information of a resource that interfaces the program with a platform, and wherein the start up of the program is terminated upon determination that the resource that interfaces the program with the platform of services included in the image forming apparatus is not compatible with the program.

8. The image forming apparatus as claimed in claim 7, wherein the program is a Java™ program;

the compiler is a Java™ compiler; and the virtual machines are Java™ virtual machines.

9. The image forming apparatus as claimed in claim 7, wherein the startup controlling unit starts the program which automatically selects the virtual machine whose version supports a model of the image forming apparatus.

10. An information processing method comprising:

a startup controlling unit which starts a program and a virtual machine loaded in an image forming apparatus from a recording medium storing the program and the virtual machine, the virtual machine being adapted to sequentially execute programs translated by a compiler;

wherein, in the startup controlling unit, upon starting the program in the image forming apparatus from the recording medium storing the program, the virtual machine whose version is compatible with the image forming apparatus is automatically selected by the program from a plurality of the virtual machines stored in the recording medium, and the selected virtual machine is started in the image forming apparatus, wherein the program acquires information of a resource that interfaces the program with a platform, and wherein the start up of the program is terminated upon determination that the resource that interfaces the program with the platform of services included in the image forming apparatus is not compatible with the program.

11. The information processing method as claimed in claim 10, wherein the program is a Java™ program;

the compiler is a Java™ compiler; and the virtual machines are Java™ virtual machines.

12. The information processing method as claimed in claim 10, wherein the virtual machine whose version supports a model of the image forming apparatus is automatically selected by the program in the startup controlling unit.

13. A non-transitory computer-readable medium storing a program that causes a computer to execute an information processing method, the method comprising:

a startup controlling unit which starts a program and a virtual machine loaded in an image forming apparatus from a recording medium storing the program and the virtual machine, the virtual machine being adapted to sequentially execute programs translated by a compiler;

wherein, in the startup controlling unit, upon starting the program in the image forming apparatus from the recording medium storing the program, the virtual machine whose version is compatible with the image forming apparatus is automatically selected by the program from a plurality of the virtual machines stored in the recording medium, and the selected virtual machine is started in the image forming apparatus, wherein the program acquires information of a resource that interfaces the program with a platform, and wherein the start up of the program is terminated upon determination that the resource that interfaces the program with the platform of services included in the image forming apparatus is not compatible with the program.

* * * * *